United States Patent [19]

Okun

[11] Patent Number: 5,698,108
[45] Date of Patent: Dec. 16, 1997

[54] FORMALDEHYDE-REDUCTION COMPOSITION AND METHODS OF USE THEREFOR

[75] Inventor: Nelya Okun, Alpharetta, Ga.

[73] Assignee: Vinings Industries, Inc., Atlanta, Ga.

[21] Appl. No.: 747,653

[22] Filed: Nov. 13, 1996

[51] Int. Cl.$^6$ ...................................................... C02F 1/58
[52] U.S. Cl. ...................... 210/702; 210/749; 210/908; 252/175; 252/180
[58] Field of Search ..................... 210/749, 908, 210/702; 252/175, 180

[56] References Cited

U.S. PATENT DOCUMENTS

| | | |
|---|---|---|
| 3,784,493 | 1/1974 | Giguere et al. . |
| 4,127,382 | 11/1978 | Perry . |
| 4,177,313 | 12/1979 | Herault . |
| 4,455,257 | 6/1984 | Hoftiezer et al. . |
| 4,775,744 | 10/1988 | Schilling et al. . |
| 4,781,840 | 11/1988 | Schilling et al. . |
| 4,787,960 | 11/1988 | Schilling et al. . |
| 4,824,577 | 4/1989 | Schwitzgelbel ......................... 210/694 |
| 5,326,378 | 7/1994 | Wilhelm et al. . |
| 5,507,951 | 4/1996 | French et al. ......................... 210/759 |
| 5,606,107 | 2/1997 | Smith ..................................... 210/762 |

FOREIGN PATENT DOCUMENTS

| | | |
|---|---|---|
| 577449 | 1/1994 | European Pat. Off. . |
| 48-072309 | 9/1973 | Japan . |
| 49-066808 | 6/1974 | Japan . |
| 49-080210 | 8/1974 | Japan . |
| 50-024404 | 3/1975 | Japan . |
| 55-119437 | 9/1980 | Japan . |
| 3-217449 | 9/1991 | Japan . |

*Primary Examiner*—Neil McCarthy
*Attorney, Agent, or Firm*—Klauber & Jackson

[57] ABSTRACT

A formaldehyde reduction composition which comprises from about 0.1% to about 0.6% by weight of a water soluble lignosulfonate salt, from about 22% to about 28% by weight of a di- or tri- alkylene amine, from 0% to about 28% by weight of di- or tri- alkanol amine, and from about 43.4 about 77.9% water. The composition is particularly useful in the treatment of aqueous media, especially calcium carbonate and kaolin mineral slurries which have been treated with a formaldehyde-releasing biocide.

16 Claims, No Drawings

5,698,108

FORMALDEHYDE-REDUCTION COMPOSITION AND METHODS OF USE THEREFOR

FIELD OF THE INVENTION

The present invention relates to a formaldehyde-reduction composition and methods of using such composition to reduce the free formaldehyde content in aqueous media such as mineral slurries or in other aqueous solutions where formaldehyde-releasing products have been used to treat the water, but free formaldehyde content is not desirable. Examples of such aqueous media are calcium carbonate and kaolin suspensions which have been treated with antimicrobial preservatives and which have a low residual content of free formaldehyde. The composition of the invention reduces the concentration of free formaldehyde to a level which is deemed safe or is undetectable.

BACKGROUND OF THE INVENTION

The availability of formaldehyde-free products has become an extremely important environmental issue. Free formaldehyde scavengers, which have found wide-spread applications for the finishing of textiles, for paper and wood treatments, for adhesives containing formaldehyde resins and for silver-halide photographic materials, are based on forming an aminoplast resin by reaction of amino compounds, such as urea or its derivatives, with formaldehyde.

Commercially produced mineral slurries are manufactured at very high solids levels to minimize the cost of freight for shipping water to the end user. Because of the high solids content of these aqueous suspensions, considerable processing and a number of chemical additives, such as polyacrylates and polyphosphates dispersants and antimicrobial preservatives, are needed to manufacture and maintain these suspensions in a useable condition, suitable for use. Some antimicrobial agents contain residual amounts of free formaldehyde remaining from the production process. This residual free formaldehyde is generally undesirable because of the suspected link to health and safety problems.

U.S. Pat. No. 3,784,493 discloses the treatment of spent sulfite liquor by changing the base metal lignosulfonates in the liquor to amine lignosulfonates which are then reacted with formaldehyde to produce products useful as, e.g. setting control agents in cement, hydration shale inhibitors and as fillers in the formation of resins.

U.S. Pat. No. 4,127,382 discloses a process for scavenging free formaldehyde from textile fabrics by contacting the fabrics with a formaldehyde scavenger consisting of a heterocyclic compound free of carbonyl groups and containing an NH group.

European Patent No. EP 577449 discloses tris(acetoxy-2-ethyl)amine and its water-soluble salts as free formaldehyde scavengers for the finishing of textiles.

Japanese Patents No. JP 49066808 and No. JP 50024404 disclose free-from-odor formaldehyde resin adhesives for plywood, prepared by using face veneers coated with 30% and 40% aqua urea, which acts to scavenge the free formaldehyde.

Japanese Patents No. JP 49080210 and No. JP 48072309 disclose odorless plywood, prepared by using formaldehyde resin adhesives, containing formaldehyde scavengers. Formaldehyde-urea resin was mixed with urea, wood flour, water, ammonium chloride and treated with hydrogen chloride solution.

Japanese Patent No. JP 55119437 discloses the manufacture of microcapsule dispersions free from formaldehyde by employing 5- or 6-membered cyclic urea derivatives or 2-oxooxazolidine and a sulfite or bisulfite.

Japanese Patent No. JP 03217449 discloses the reduction of free formaldehyde in polyoxymethylene molding compositions by employing 1,2,3-benzotriazole compounds.

All of the aforementioned scavengers, however, have severe limitations when used to remove free formaldehyde from mineral suspensions, particularly in calcium carbonate and kaolin. There are several reasons for this. The first reason is that all of these scavengers increase the suspension viscosity, which is undesirable in commercially available mineral slurries. Secondly, they lack effectiveness at low concentrations in reducing the free formaldehyde content to a desirable level. Finally, most scavengers are not FDA cleared for use in mineral slurries used in the manufacture of pulp and paper that may come in contact with food or are not recognized as safe biocide adjuvants for these applications.

OBJECTS OF THE INVENTION

It is an object of the present invention to provide a composition for reducing the free formaldehyde content in suspensions or in any other aqueous media where a formaldehyde-containing additive has been used to treat the suspension, and a residual free formaldehyde content is not desirable.

It is a further object of the present invention to provide a scavenger for reducing the free formaldehyde content in calcium carbonate and kaolin suspensions, previously treated with formaldehyde releasing biocides.

It is an another object of the present invention to provide a method of producing the scavenger for formaldehyde reduction.

It is an additional object of the present invention to provide a means of odor reduction in suspensions or in other aqueous solutions, previously treated with thione or carbamate antimicrobial agents, which are likely to have some residual free formaldehyde.

It is also an object of the present invention to provide a scavenger which has minimal effect on the suspension viscosity of mineral slurries.

DETAILED DESCRIPTION OF THE INVENTION

The present invention relates to a formaldehyde reduction composition, especially for use in mineral slurries. More particularly, the invention relates to a formaldehyde reduction composition which comprises from about 0.1 to about, preferably 0.2 to 0.4%, by weight of a water soluble lignosulfonate salt; about 22 to about 28%, preferably 24 to 26%, by weight of a di- or tri- alkylene amine; from 0 to about 28%, preferably 0 to 26%, by weight of di- or tri-alkanol amine; and about 43.4 to about 77.9%, preferably 50 to 70%, by weight of water.

In the preparation of the composition of the invention, the water-soluble lignosulfonate can be any water-soluble salt thereof. Typically, ammonium or sodium lignosulfonates are employed, with the sodium salts being preferred. Aqueous solutions of sodium lignosulfonate are preferred for their ease in manufacture, but dry materials can be used. Suitable lignosulfonates are well known and are readily available commercially. Preferably, the water-soluble lignosulfonate is employed in preparing the composition of the invention in the form of a water solution having a concentration of about 50% by weight of the Lignosulfonate.

Two classes of amines are employed in the preparation of the composition of the invention: di- and tri- alkylene amines and mono-, di- and tri- alkanol amines.

Representative examples of the alkylene amines include ethylenediamine and diethylenetriamine. representative examples of the alkanol amines include monoethanolamine, diethanolamine and triethanolamine. Ethylenediamine and triethanolamine are preferred. These amines are well known in the art and they are readily available commercially.

Reduction of free formaldehyde in aqueous media is readily accomplished by mixing the scavenger composition with the aqueous media to be treated and allowing the composition to remain in contact with the aqueous media (typically at ambient temperatures) for a period of time of about 30 to about 60, preferably 30 to 40, minutes. In the case of the aqueous media being a solution, about 500 to about 1,500, preferably 750 to 1,000, ppm of the composition are employed. In the case of the aqueous media being a mineral slurry, about 500 to about 2,000, preferably 1,000 to 1,500, ppm are employed.

Typically, the aqueous media are mineral slurries such as aqueous slurries of calcium carbonate or kaolin. The compositions of the invention have been found to be especially useful for scavenging free formaldehyde in such slurries, since the free formaldehyde can be reduced to the desired level without adversely affecting the viscosity of such slurries. Thus, the composition of the invention has been found to be particularly advantageous for reducing the level of free formaldehyde in contaminated kaolin suspensions.

The following examples are included for illustrative purposes and should not be interpreted as limiting the scope of the invention.

Example 1

General Procedure

The lignosulfonate used throughout Examples 2–10 below was de-sugared sodium lignosulfonate sold by Georgia Pacific Corp. in the form of a 50 wt. % aqueous solution under the brand name of "Lignosite 458". To 0.2–1.2 wt. % of such aqueous solution was added 42.8–77.4 wt. % water with continuous agitation. Mixing was continued for several minutes until a uniform solution was obtained. To the resultant solution was slowly added 22–28 wt. % ethylenediamine with continuous agitation. After about 10–15 minutes, 0.0–28 wt. % of triethanolamine was slowly added with continuous agitation. The resultant composition was stored for several days, at which point the amine odor associated with such type of composition disappeared.

The biocides employed in Examples 2–10 were: "AMA-420", "AMA-424" and "AMA-35D-P". The foregoing are brand names for biocides available from Vinings Industries, Inc. and are based on "Dazomet", i.e. tetrahydro-3,5-dimethyl-2H-1,3,5-thiadiazine-2-thione. "AMA-420" is an aqueous emulsion, "AMA-424" is an aqueous caustic solution and "AMA-35D-P" is a dry powder.

The mineral suspensions employed in Examples 2–10 were "H-90", a calcium carbonate slurry obtained from Omya, Inc., and Kaobrite® and Kaogloss® kaolin suspensions obtained from Thiele Kaolin Co.

The formaldehyde concentration in the mineral slurries and the water slurries was determined by the following method: The aqueous portion of the mineral slurry was obtained by centrifuging 10 ml of slurry for at least 55 minutes at 4500 rpm using a "Mistral 2000" centrifuge. The water layer containing the formaldehyde fraction was removed and derivatized with 2,4-dinitrophenylhydrazine. The formaldehyde was separated and detected using a Waters HPLC with a Waters C-18 column. The absorbance of the derivatized formaldehyde was measured at 365 nm. The formaldehyde was determined with reference to a standard curve using the foregoing method.

The viscosity of the tested samples was determined using a Brookfield Viscometer, model LVT, with a No. 2 spindle at 60 rpm. Before the viscosity measurement, calcium carbonate slurry samples were agitated in the bottles for about 10 seconds, and then they were allowed to rest for about 2–3 minutes to deaerate. The kaolin clay samples were not agitated before viscosity measurement. Viscosity determinations were performed at room temperature.

Assays of the free formaldehyde were performed in formaldehyde-spiked water solutions, as well as in the indicated mineral slurries treated with the biocides, all of which contained residual formaldehyde.

Water solutions, spiked with 37.5, 75.0 or 112.5 ppm of formaldehyde, were treated with 500, 1000 and 1500 ppm of the compositions of the invention and tested for free formaldehyde content. The results are shown in Tables II–X.

Commercially prepared calcium carbonate, kaolin clay and titanium dioxide suspensions were pre-treated with "AMA-420", "AMA-424" or "AMA-35D-P" at the indicated dosage. All three biocides contain some formaldehyde as an impurity and contribute to the total level found in the slurry. These slurries were treated with the various scavenger formulations at various levels. Each sample was tested both for free formaldehyde concentration and viscosity. The results are presented in Tables II–X.

Table I indicates the components of samples A–I which are utilized throughout the examples described below. Samples A–F relate to compositions of the invention, while samples G and H correspond to Examples 3 and 4 of U.S. Pat. No. 3,784,493 (hereinafter referred to as the '493 patent). Sample I refers to an aqueous ethylenediamine composition which does not contain any lignosulfonate.

TABLE I

| Sample No. | Lignosulfonate wt. % | EDA[1] wt. % | DEA[2] wt. % | MEA[3] wt. % | TEA[4] wt. % | Water wt. % |
| --- | --- | --- | --- | --- | --- | --- |
| A | 0.4 | 24 | 0 | 0 | 0 | 75.6 |
| B | 0.5 | 25 | 0 | 0 | 0 | 74.5 |
| C | 0.6 | 26 | 0 | 0 | 0 | 73.4 |
| D | 0.8 | 24 | 0 | 0 | 24 | 51.2 |
| E | 1.0 | 25 | 0 | 0 | 25 | 49.0 |
| F | 1.2 | 26 | 0 | 0 | 26 | 46.8 |
| G | 83.9 | 0 | 16.1 | 0 | 0 | 0 |
| H | 88.4 | 0 | 0 | 11.6 | 0 | 0 |
| I | 0 | 48.7 | 0 | 0 | 0 | 56.2 |

[1]Ethylenediamine
[2]Diethanolamine
[3]Monoethanolamine
[4]Triethanolamine

Example 2

This example indicates the efficiency of scavenger samples A–I in reducing the concentration of formaldehyde (designated as "HCHO") in water which had been spiked with the indicated level of formaldehyde. As may be seen from Table II, all of the scavenger samples tested proved to be effective in removing formaldehyde from water.

TABLE II

| Test No. | Initial HCHO Conc. (ppm) | Sample No. | Sample Dosage ppm | Detected HCHO ppm | Removal Effic. % |
|---|---|---|---|---|---|
| 1 | 37.5 | A | 500 | none | 100 |
| 2 | 37.5 | B | 500 | none | 100 |
| 3 | 37.5 | C | 500 | none | 100 |
| 4 | 37.5 | D | 500 | none | 100 |
| 5 | 37.5 | E | 500 | none | 100 |
| 6 | 37.5 | F | 500 | none | 100 |
| 7 | 37.5 | G | 500 | none | 100 |
| 8 | 37.5 | H | 500 | none | 100 |
| 9 | 37.5 | I | 500 | none | 100 |
| 10 | 75 | A | 1000 | none | 100 |
| 11 | 75 | B | 1000 | none | 100 |
| 12 | 75 | C | 1000 | none | 100 |
| 13 | 75 | D | 1000 | none | 100 |
| 14 | 75 | E | 1000 | none | 100 |
| 15 | 75 | F | 1000 | none | 100 |
| 16 | 75 | G | 1000 | none | 100 |
| 17 | 75 | H | 1000 | none | 100 |
| 18 | 75 | I | 1000 | none | 100 |
| 19 | 112.5 | A | 1500 | none | 100 |
| 20 | 112.5 | B | 1500 | none | 100 |
| 21 | 112.5 | C | 1500 | none | 100 |
| 22 | 112.5 | D | 1500 | none | 100 |
| 23 | 112.5 | E | 1500 | none | 100 |
| 24 | 112.5 | F | 1500 | none | 100 |
| 25 | 112.5 | G | 1500 | none | 100 |
| 26 | 112.5 | H | 1500 | none | 100 |
| 27 | 112.5 | I | 1500 | none | 100 |

Example 3

This example was carried out to demonstrate the efficiency of scavenger samples A–I in reducing the concentration of formaldehyde in a calcium carbonate slurry which had been treated with biocide AMA-420 at dosages of 920 and 1500 ppm and at various scavenger to biocide ratios. The results as shown in Table III indicate that scavenger samples G and H corresponding to Examples 3 and 4 of the '493 patent are much less efficient at the removal of formaldehyde from a calcium carbonate slurry than the compositions of the invention (samples A–C).

TABLE III

| Test No. | AMA-420 Dosage ppm | Sample No. | Sample Dosage ppm | Scavenger to Biocide Ratio | Detected HCHO ppm | Efficiency Removal % |
|---|---|---|---|---|---|---|
| 28 | 920 | Control | 0 | 0 | 15.8 | 0 |
| 29 | 920 | A | 500 | 0.54 | 24 | 74.6 |
| 30 | 920 | A | 1000 | 1.08 | 1.2 | 92.4 |
| 31 | 920 | B | 500 | 0.54 | 3 | 79.8 |
| 32 | 920 | B | 1000 | 1.08 | none | 100 |
| 33 | 920 | C | 500 | 0.54 | 2 | 87.3 |
| 34 | 920 | C | 1000 | 1.08 | none | 100 |
| 35 | 920 | G | 500 | 0.54 | 15.5 | 2 |
| 36 | 920 | G | 1000 | 1.08 | 14.9 | 6 |
| 37 | 920 | H | 500 | 0.54 | 15.5 | 2 |
| 38 | 920 | H | 1000 | 1.08 | 14.8 | 6.5 |
| 39 | 920 | I | 500 | 0.54 | 3.3 | 78.9 |
| 40 | 920 | I | 1000 | 1.08 | none | 100 |
| 41 | 1500 | Control | 9 | 0 | 23.67 | 0 |
| 42 | 1500 | A | 1000 | 0.67 | 2.9 | 88 |
| 43 | 1500 | A | 2000 | 1.34 | 1.2 | 95.2 |
| 44 | 1500 | B | 1000 | 0.67 | 2 | 91.6 |
| 45 | 1500 | B | 2000 | 1.34 | none | 100 |
| 46 | 1500 | C | 1000 | 0.67 | 1.3 | 94.5 |
| 47 | 1500 | C | 2000 | 1.34 | none | 100 |
| 48 | 1500 | G | 1000 | 0.67 | 24.1 | 7.4 |
| 49 | 1500 | G | 2000 | 1.34 | 19.1 | 19.6 |
| 50 | 1500 | H | 1000 | 0.67 | 18.1 | 6.6 |

TABLE III-continued

| Test No. | AMA-420 Dosage ppm | Sample No. | Sample Dosage ppm | Scavenger to Biocide Ratio | Detected HCHO ppm | Efficiency Removal % |
|---|---|---|---|---|---|---|
| 51 | 1500 | H | 2000 | 1.34 | 15.6 | 23.7 |
| 52 | 1500 | I | 1000 | 0.67 | 4.4 | 81.8 |
| 53 | 1500 | J | 2000 | 1.34 | none | 100 |

Example 4

This example was carried out to demonstrate the efficiency of scavenger samples D–I in reducing the concentration of formaldehyde in a calcium carbonate slurry which had been treated with biocide AMA-424 at dosages of 1200 ppm and at various scavenger to biocide ratios. The results as shown in Table IV indicate that scavenger samples G and H corresponding to Examples 3 and 4 of the '493 patent are much less efficient at the removal of formaldehyde from a calcium carbonate slurry than the compositions of the invention (samples D–F).

TABLE IV

| Test No. | AMA-424 Dosage ppm | Sample No. | Sample Dosage ppm | Scavenger to Biocide Ratio | Detected HCHO ppm | Efficiency Removal % |
|---|---|---|---|---|---|---|
| 54 | 1200 | Control | 0 | 0 | 27.3 | 0 |
| 55 | 1200 | D | 1200 | 1 | 3 | 94.3 |
| 56 | 1200 | D | 1500 | 1.25 | none | 100 |
| 57 | 1200 | E | 1200 | 1 | 2.9 | 94.6 |
| 58 | 1200 | E | 1500 | 1.25 | none | 100 |
| 59 | 1200 | F | 1200 | 1 | 1.8 | 96.6 |
| 60 | 1200 | F | 1500 | 1.25 | none | 100 |
| 61 | 1200 | G | 1200 | 1 | 24.2 | 11.4 |
| 62 | 1200 | G | 1500 | 1.25 | 19.1 | 30 |
| 63 | 1200 | H | 1200 | 1 | 22.5 | 17.6 |
| 64 | 1200 | H | 1500 | 1.25 | 17.4 | 36.3 |
| 65 | 1200 | I | 1200 | 1 | 1.4 | 95 |
| 66 | 1200 | I | 1500 | 1.25 | none | 100 |

Example 5

This example was carried out to demonstrate the efficiency of scavenger samples D–I in reducing the concentration of formaldehyde in a calcium carbonate slurry which had been treated with biocide AMA-35D-P at dosages of 300 ppm and at various scavenger to biocide ratios. The results as shown in Table V indicate that scavenger samples G and H corresponding to Examples 3 and 4 of the '493 patent are much less efficient at the removal of formaldehyde from a calcium carbonate slurry than the compositions of the invention (samples D–F).

TABLE V

| Test No. | AMA-35D-P Dosage ppm | Sample No. | Sample Dosage ppm | Scavenger to Biocide Ratio | Detected HCHO ppm | Efficiency Removal % |
|---|---|---|---|---|---|---|
| 67 | 300 | Control | 0 | 0 | 106.5 | 0 |
| 68 | 300 | D | 1200 | 4 | 19.3 | 81.9 |
| 69 | 1200 | D | 1500 | 1.25 | none | 100 |
| 70 | 1200 | E | 1200 | 1 | 2.9 | 94.6 |
| 71 | 1200 | F | 1500 | 1.25 | none | 100 |
| 72 | 1200 | F | 1200 | 1 | 1.8 | 96.6 |

TABLE V-continued

| Test No. | AMA-35D-P Dosage ppm | Sample No. | Sample Dosage ppm | Scavenger to Biocide Ratio | Detected HCHO ppm | Efficiency Removal % |
|---|---|---|---|---|---|---|
| 73 | 1200 | F | 1500 | 1.25 | none | 100 |
| 74 | 1200 | G | 1200 | 1 | 24.2 | 11.4 |
| 75 | 1200 | G | 1500 | 1.25 | 19.1 | 30 |
| 76 | 1200 | H | 1200 | 1 | 22.5 | 17.6 |
| 77 | 1200 | H | 1500 | 1.25 | 17.4 | 36.3 |
| 78 | 1200 | I | 1200 | 1 | 1.4 | 95 |
| 79 | 1200 | I | 1500 | 1.25 | none | 100 |

Example 6

This example was carried out to demonstrate the efficiency of scavenger samples C and F–I in reducing the concentration of formaldehyde in a titanium dioxide slurry which had been treated with biocide AMA-420 at dosages of 1000 ppm and at various scavenger to biocide ratios. The results as shown in Table VI indicate that scavenger samples G and H corresponding to Examples 3 and 4 of the '493 patent are much less efficient at the removal of formaldehyde from a titanium dioxide slurry than the compositions of the invention.

TABLE VI

| Test No. | AMA-420 Dosage ppm | Sample No. | Sample Dosage ppm | Scavenger to Biocide Ratio | Detected HCHO ppm | Efficiency Removal % |
|---|---|---|---|---|---|---|
| 80 | 1000 | Control | 0 | 0 | 41 | 0 |
| 81 | 1000 | C | 1000 | 1 | 8 | 80.5 |
| 82 | 1000 | C | 2000 | 2 | none | 100 |
| 83 | 1000 | F | 1000 | 1 | 6.3 | 84.6 |
| 84 | 1000 | F | 2000 | 2 | none | 100 |
| 85 | 1000 | G | 1000 | 1 | 39 | 4.9 |
| 86 | 1000 | G | 2000 | 2 | 20.5 | 50 |
| 87 | 1000 | H | 1000 | 1 | 39 | 4.9 |
| 88 | 1000 | H | 2000 | 2 | 20.5 | 50 |
| 89 | 1000 | I | 1000 | 1 | 5 | 87.8 |
| 90 | 1000 | I | 2000 | 2 | none | 1.00 |
| 91 | 1200 | I | 1000 | 1 | 1.4 | 95 |
| 92 | 1200 | I | 2000 | 1.25 | none | 100 |

Example 7

This example was carried out to demonstrate the efficiency of scavenger samples D–I in reducing the concentration of formaldehyde in a kaolin clay slurry which had been treated with biocide AMA-420 at dosages of 1200 ppm and at various scavenger to biocide ratios. The results as shown in Table VII below indicate that scavenger samples G and H corresponding to Examples 3 and 4 of the '493 patent are much less efficient at the removal of formaldehyde from a kaolin clay slurry than the compositions of the invention.

TABLE VII

| Test No. | AMA-420 Dosage ppm | Sample No. | Sample Dosage ppm | Scavenger to Biocide Ratio | Detected HCHO ppm | Efficiency Removal % |
|---|---|---|---|---|---|---|
| 94 | 1200 | Control | 0 | 0 | 52.7 | 0 |
| 95 | 1200 | D | 1200 | 1 | 3 | 94.3 |
| 96 | 1200 | D | 1500 | 1.25 | none | 100 |

TABLE VII-continued

| Test No. | AMA-420 Dosage ppm | Sample No. | Sample Dosage ppm | Scavenger to Biocide Ratio | Detected HCHO ppm | Efficiency Removal % |
|---|---|---|---|---|---|---|
| 97 | 1200 | E | 1200 | 1 | 2.9 | 94.6 |
| 98 | 1200 | E | 1500 | 1.25 | none | 100 |
| 99 | 1200 | F | 1200 | 1 | 1.8 | 96.6 |
| 100 | 1200 | F | 1500 | 1.25 | none | 100 |
| 101 | 1200 | G | 1200 | 1 | 30.2 | 42.7 |
| 102 | 1200 | G | 1500 | 1.25 | 24.8 | 52.9 |
| 103 | 1200 | H | 1200 | 1 | 24.8 | 52.9 |
| 104 | 1200 | H | 1500 | 1.25 | 24.1 | 54.3 |
| 105 | 1200 | I | 1200 | 1 | 1.8 | 96.5 |
| 108 | 1200 | I | 1500 | 1.25 | none | 100 |

Example 8

This example was carried out to demonstrate the efficiency of scavenger samples D–I in reducing the concentration of formaldehyde in a kaolin clay slurry which had been treated with biocide AMA-35D-P at dosages of 300 ppm and at various scavenger to biocide ratios. The results as shown in Table VIII below indicate that scavenger samples G and H corresponding to Examples 3 and 4 of the '493 patent are much less efficient at the removal of formaldehyde from a kaolin clay slurry than the compositions of the invention.

TABLE VIII

| Test No. | AMA-420 Dosage ppm | Sample No. | Sample Dosage ppm | Scavenger to Biocide Ratio | Detected HCHO ppm | Efficiency Removal % |
|---|---|---|---|---|---|---|
| 107 | 300 | Control | 0 | 0 | 106.5 | 0 |
| 108 | 300 | D | 1200 | 1 | 19.3 | 81.9 |
| 109 | 300 | D | 1500 | 1.25 | none | 100 |
| 110 | 300 | E | 1200 | 1 | 16.3 | 84.7 |
| 111 | 300 | E | 1500 | 1.25 | none | 100 |
| 112 | 300 | F | 1200 | 1 | 10.9 | 89.7 |
| 113 | 300 | F | 1500 | 1.25 | none | 100 |
| 114 | 300 | G | 1200 | 1 | 50.3 | 52.8 |
| 115 | 300 | G | 1500 | 1.25 | 51.3 | 51.9 |
| 116 | 300 | H | 1200 | 1 | 52.1 | 51.1 |
| 117 | 300 | H | 1500 | 1.25 | 50.3 | 52.8 |
| 118 | 300 | I | 1200 | 1 | 5.5 | 94.8 |
| 119 | 300 | I | 1500 | 1.25 | none | 100 |

Example 9

This example demonstrates the effect of the formaldehyde scavengers of the invention on the viscosity of a kaolin clay slurry treated with biocide AMA-424 as a function of storage time. The viscosity was measured using a Brookfield viscometer Model LVT with a No. 2 spindle at 60 rpm. It is highly desirable to maintain the slurry viscosity of the mineral slurry at a constant level. As may be seen from Table IX, the control sample, with no scavenger, shows some viscosity growth with time. Sample I (which involves the use of ethylenediamine alone without any lignosulfonate) shows considerably more growth in viscosity than the control, which is undesirable. Scavenger samples D, E and F of the invention actually reduce the viscosity of the slurry and maintain such viscosity at a more constant level than the control. Scavenger samples G and H corresponding to Examples 3 and 4 of the '493 patent are also effective in controlling viscosity growth over a period of time.

TABLE IX

| Test No. | Sample No. | Sample Dosage ppm | Viscosity Day 0 | Viscosity Day 1 | Viscosity Day 2 | Viscosity Day 3 | Viscosity Day 6 |
|---|---|---|---|---|---|---|---|
| 120 | Control | 0 | 150 | 160 | 180 | 200 | 220 |
| 121 | D | 1000 | 150 | 170 | 190 | 220 | 230 |
| 122 | D | 1200 | 160 | 230 | 230 | 235 | 240 |
| 123 | E | 1000 | 160 | 23D | 230 | 235 | 240 |
| 124 | E | 1200 | 160 | 230 | 230 | 235 | 240 |
| 125 | F | 1000 | 160 | 230 | 230 | 235 | 240 |
| 126 | F | 1200 | 170 | 240 | 250 | 270 | 280 |
| 127 | G | 1000 | 150 | 160 | 175 | 200 | 220 |
| 125 | G | 1200 | 150 | 165 | 175 | 210 | 220 |
| 129 | H | 1000 | 150 | 16D | 175 | 200 | 220 |
| 130 | H | 1200 | 150 | 165 | 175 | 210 | 220 |
| 131 | I | 1000 | 290 | 240 | 260 | 280 | 300 |
| 132 | I | 1200 | 200 | 240 | 260 | 280 | 300 |

Example 10

This example demonstrates the effect of the formaldehyde scavengers of the invention on the viscosity of a calcium carbonate slurry treated with biocide AMA-420 as a function of storage time. The viscosity was measured using a Brookfield viscometer Model LVT with a No. 2 spindle at 60 rpm. It is highly desirable to maintain the slurry viscosity of the mineral slurry at a constant level. As may be seen from Table X, the control sample, with no scavenger, shows some viscosity growth with time. Sample I (which involves the use of ethylenediamine alone without any lignosulfonate) shows considerably more growth in viscosity than the control, which is undesirable. Scavenger samples A, B and C and D, E and F of the invention actually reduce the viscosity of the slurry and maintain such viscosity at a more constant level than the control. Scavenger samples G and H corresponding to Examples 3 and 4 of the '493 patent are also effective in controlling viscosity growth over a period of time.

TABLE X

| Test No. | Sample No. | Sample Dosage ppm | Viscosity Day 0 | Viscosity Day 1 | Viscosity Day 2 | Viscosity Day 3 | Viscosity Day 6 |
|---|---|---|---|---|---|---|---|
| 133 | Control | 0 | 250 | 300 | 310 | 320 | 440 |
| 134 | A | 1000 | 230 | 240 | 250 | 265 | 275 |
| 135 | B | 1000 | 222 | 235 | 240 | 240 | 265 |
| 138 | C | 1000 | 215 | 230 | 240 | 240 | 260 |
| 137 | D | 1000 | 215 | 230 | 24.0 | 240 | 260 |
| 138 | E | 1000 | 220 | 235 | 240 | 240 | 260 |
| 139 | F | 1000 | 220 | 235 | 240 | 245 | 280 |
| 140 | G | 1000 | 210 | 215 | 215 | 215 | 220 |
| 141 | H | 1000 | 210 | 215 | 215 | 215 | 220 |
| 142 | I | 1000 | 250 | 360 | 495 | 600 | 610 |

What is claimed is:

1. A formaldehyde reduction composition which comprises from about 0.1% to about 0.6% by weight of a water-soluble lignosulfonate salt, from about 22% to about 28% by weight of a di- or tri- alkylene amine, from 0% to about 28% by weight of di- or tri- alkanol amine, and from about 43.4 about 77.9% water.

2. The composition of claim 1 wherein the amount of the di-or tri- alkylene amine is from 24% to 26% by weight.

3. The composition of claim 1 wherein the amount of the di-or tri- alkanol amine is from 0% to 26% by weight.

4. The composition of claim 1 wherein the amount of the alkanol amine is about equal to the amount of the alkyleneamine.

5. The composition of claim 1 wherein the water-soluble lignosulfonate is sodium lignosulfonate.

6. The composition of claim 1 wherein the di- or tri-alkyleneamine is ethylenediamine or diethylenetriamine.

7. The composition of claim 1 wherein the di- or tri-ethanolamine is diethanolamine or triethanolamine.

8. A process for reducing the level of free formaldehyde present in an aqueous medium which comprises treatment of the aqueous medium with a formaldehyde reduction composition comprising from about 0.1% to about 0.6% by weight of a water- soluble lignosulfonate salt, from about 22% to about 28% by weight of a di- or tri- alkylene amine, from 0% to about 28% by weight of di- or tri- alkanol amine, and from about 43.4 about 77.9% water.

9. The process of claim 8 wherein the amount of the di- or tri- alkylene amine is from 24% to 26% by weight.

10. The process of claim 8 wherein the amount of the di- or tri- alkanol amine is from 0% to 26% by weight.

11. The process of claim 8 wherein the amount of the alkanol amine is about equal to the amount of the alkyleneamine.

12. The process claim 8 wherein the water-soluble lignosulfonate is sodium lignosulfonate.

13. The process of claim 8 wherein the di- or tri-alkyleneamine is ethylenediamine or diethylenetriamine.

14. The process of claim 8 wherein the di- or tri- ethanolamine is diethanolamine or triethanolamine.

15. The process of claim 8 wherein the aqueous media has been treated with a formaldehyde releasing biocide prior to treatment with said formaldehyde reduction composition.

16. The process of claim 8 wherein the aqueous media comprises a calcium carbonate or kaolin suspension.

* * * * *